(No Model.)
G. B. PRESCOTT, Jr.
DISTRIBUTION OF ELECTRICITY BY SECONDARY BATTERIES.
No. 402,192. Patented Apr. 30, 1889.
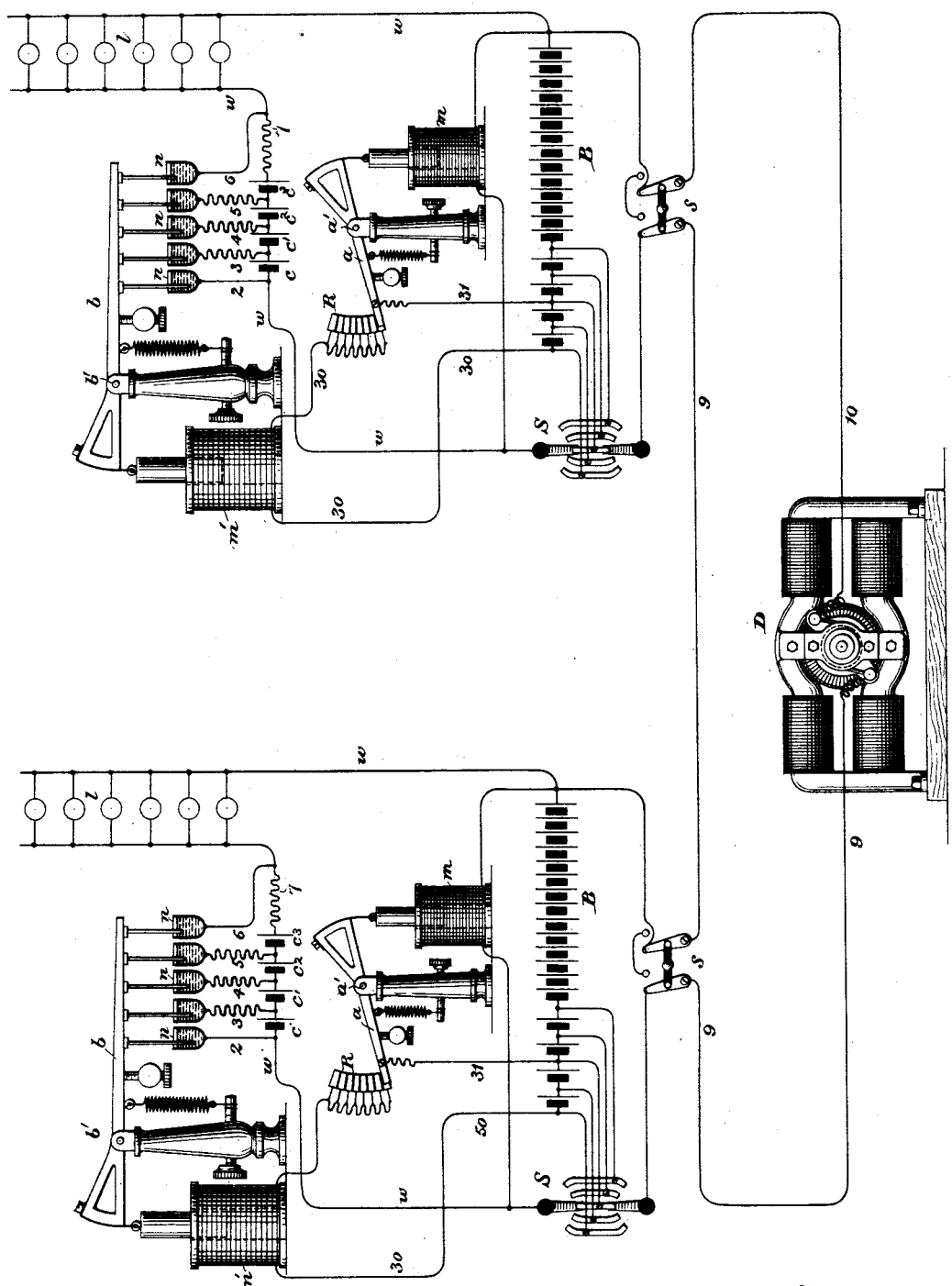

UNITED STATES PATENT OFFICE.

GEORGE B. PRESCOTT, JR., OF NEWARK, NEW JERSEY, ASSIGNOR TO THE ELECTRICAL ACCUMULATOR COMPANY, OF NEW YORK.

DISTRIBUTION OF ELECTRICITY BY SECONDARY BATTERIES.

SPECIFICATION forming part of Letters Patent No. 402,192, dated April 30, 1889.

Application filed February 18, 1889. Serial No. 300,261. (No model.)

*To all whom it may concern:*

Be it known that I, GEORGE B. PRESCOTT, Jr., a citizen of the United States, and a resident of Newark, in the county of Essex and State of New Jersey, have invented certain new and useful Improvements in the Distribution of Electricity by Secondary Batteries, of which the following is a specification.

My invention is an improvement in the distribution of electricity by secondary batteries.

The invention contemplates the use of a primary generator of electricity located at a central station and one or more sub-stations, at each of which there is located a secondary battery and a working-circuit to be supplied thereby. The main and sub stations are to be connected by two or more main leads called the "charging-circuit." In this arrangement of apparatus, when the dynamo is being operated to charge the battery at any given station and the working-circuit is simultaneously supplied from the battery, it happens that the excessive electro-motive force necessarily employed to charge the battery is manifest and is injuriously active in the working-circuit. My invention is designed to obviate this difficulty by the employment of apparatus automatically operative.

In a circuit connecting opposite terminals of the battery I place an electro-magnet of high resistance. This is preferably in the form of a solenoid. In the working-circuit I place a series of cells yielding a counter electro-motive force and having very small storage capacity. These cells are normally cut out from the working-circuit by circuits formed round each cell and containing a low artificial resistance of considerable carrying capacity. A switch or circuit-changer composed of a series of electrical contact-points operating in a series of mercury-cups, respectively, is controlled by an electro-magnet of low resistance located in a local circuit under control of the magnet first described. When the electro-motive force at the battery-terminals rises above the normal, the magnet is operated, and this, acting through the electro-magnetic switch, introduces successively the cells yielding a counter electro-motive force. A drop in electro-motive force is thus produced between the battery-terminals and the terminals of the translating devices in the working-circuit, so that the electro-motive force at the translating devices is maintained at a normal or predetermined point. The same result in reverse would be attained should the electro-motive force at the battery-terminals fall, for in this case the magnet would operate to remove or withdraw one or more cells, yielding a counter electro-motive force.

The accompanying drawing illustrates my invention.

D is a dynamo located at one station.

9 and 10 are conductors forming a charging-circuit. There are one or more other stations at which are located series of cells of secondary battery B. These are introduced and withdrawn with respect to the charging-circuit by operating the switches $s$. The two stations shown are substantially alike, and in the description either one may be referred to. In connection with battery B there is a regulating-switch, S, for varying the number of cells of battery B in circuit. A working-circuit, $w$, containing lamps 1, is connected to the secondary battery B, and is supplied with electricity from this source. In the working-circuit $w$, but normally having a circuit formed round them individually and collectively, are a series of electrolytic cells yielding a counter electro-motive force, $c$ $c'$ $c^2$ $c^3$. These cells are of very small storage capacity, and their plates are preferably formed of a practically inoxidizable metal—such as platinum, or a platinized surface, or an alloy of lead and antimony—in this case the latter forming the larger part of the alloy. These cells are given a small capacity, because when removed from operative connection with the working-circuit they are in a low-resistance circuit and would generate heat. Storage capacity is of no utility when these cells are in the working-circuit, the counter electro-motive force being the useful and desirable feature.

From the terminals of each cell $c$ to $c^3$, tap-wires 2, 3, 4, 5, and 6 are led to a series of fixed mercury-cups, $n$. The tap-wires 3, 4, and 5 have a small artificial resistance of considerable carrying capacity. These resistances prevent complete short-circuiting of any single cell. A resistance, 7, of similar nature, prevents a short-circuit of the entire series of cells $c$ to $c^3$.

$b$ is a bar of conducting material pivoted at $b'$. From this bar there project a series of contact-points of varying length, so that in reciprocating the bar $b$ upon its pivot $b'$, the contact-points will make and break contact with their respective mercury-cups successively. The bar $b$ is under the control of a solenoid electro-magnet, $m'$, the core of which is fixed to the end of bar $b$. Magnet $m'$ is in local circuit 30 31, containing one or two cells of the secondary battery B and an adjustable artificial resistance, R. One terminal of this circuit, 30, is connected to resistance R, which is fixed in position. The second terminal, 31, is connected to a movable contact, $a$, which is in the form of a bar pivoted at $a'$. The contact $a$ is controlled and operated by a solenoid-magnet, $m$, the core of which is attached to the bar $a$. Magnet $m$ is in a circuit connecting opposite terminals of the secondary battery B, and is in its essential characteristics a voltmeter having a fine-wire winding, while magnet $m'$ in the local circuit has a coarse-wire winding.

As shown in the drawing, the electro-motive force at the battery-terminals is normal, and the working-circuit is being supplied therefrom. Let us suppose that the dynamo is now started into operation to charge the battery. Its electro-motive force must exceed by, say, one-half volt per cell the normal electro-motive force of the battery, and this excess is immediately apparent at the battery-terminals and in the working-circuit. The increased electro-motive force causes magnet $m$ to draw in its core. This changes the point of contact between $a$ and R. Resistance is withdrawn from the circuit 30 31, and the current intensity therein is increased. Magnet $m'$ draws in its core, tilting bar $b$, and, breaking the circuit of wire 6, introduces the counter electro-motive force of cell $c^3$. This causes a drop of, say, two volts at the lamp-terminals, and if the rise in electro-motive force is greater than this the operation of magnet $m$ will be in correspondence therewith, and the movement of magnet $m'$ corresponding to that of $m$, its increased movement will cause additional cells $c^2$, &c., to be introduced into the circuit $w$.

In case of a drop in electro-motive force or a decrease thereof, the reverse of the operation described will occur. The core of $m$ will be allowed to withdraw. Resistance will be added to circuit 30 31 at R. The core of magnet $m'$ will be allowed to withdraw, and cells $c$ to $c^3$ will be again removed from operative connection with working-circuit $w$.

What I claim, and desire to secure by Letters Patent, is—

1. The combination of a source of electricity, a working-circuit therefor containing translating devices, a series of cells yielding a counter electro-motive force, and means for successively introducing or withdrawing such cells in accordance with variations in the electro-motive force, substantially as described.

2. The combination of a secondary battery, a working-circuit therefor containing translating devices, a series of cells yielding a counter electro-motive force, and a switch or circuit-changer for successively introducing or withdrawing said cells with respect to the working-circuit, substantially as described.

3. The combination of a suitable source of electricity, a working-circuit therefor containing translating devices, a series of cells yielding a counter electro-motive force, and an automatic switch or circuit-changer for successively introducing or withdrawing said cells with respect to the working-circuit operated by variations in electro-motive force at said source of electricity, substantially as described.

4. The combination of a secondary battery, a working-circuit therefor containing translating devices, such as lamps, a series of cells yielding a counter electro-motive force located between the battery and translating devices, an electro-magnetic switch or circuit-changer for successively introducing and withdrawing said cells, and an electro-magnet in a circuit joining opposite terminals of the secondary battery controlling said switch, substantially as described.

5. The combination of a secondary battery, a charging-circuit therefor containing a primary generator of electricity, a working-circuit for the secondary battery containing translating devices, a series of cells yielding a counter electro-motive force, and a switch or circuit-changer for successively introducing or withdrawing said cells with respect to the working-circuit, substantially as described.

6. The combination of a primary generator of electricity located at one station, two or more series of cells of secondary battery located at sub-stations, a charging-circuit connecting said stations, a working-circuit for each series of cells containing translating devices, a series of cells yielding a counter electro-motive force for each working-circuit, and a switch or circuit-changer for successively introducing or withdrawing said cells with respect to said working-circuit, substantially as described.

7. The combination of a primary generator of electricity located at one station, two or more series of cells of secondary battery located at sub-stations, a charging-circuit uniting all said stations, a working-circuit for each series of cells containing translating devices, a series of cells for each working-circuit yielding a counter electro-motive force with respect to the battery, a switch or circuit-changer for successively introducing or withdrawing said cells with respect to said working-circuit, and means for automatically operating said switch, consisting of an electro-magnet in a circuit connecting opposite terminals of the secondary battery and an electro-magnet in a local circuit having its armature connected with said switch, substantially as described.

8. The combination of a source of electricity, a working-circuit therefor containing translating devices, a series of cells yielding a counter electro-motive force having small storage capacity, and a switch for successively introducing or withdrawing such cells in accordance with variations in electro-motive force of said source, substantially as described.

9. The combination of a suitable source of electricity, a working-circuit therefor containing translating devices, a series of cells yielding a counter electro-motive force having plates or elements of practically inoxidizable material, and a switch for introducing and withdrawing said cells in accordance with variations in electro-motive force of said source of electricity, whereby the electro-motive force in the working-circuit is maintained practically constant, substantially as described.

10. The combination of a suitable source of electricity, a working-circuit therefor containing translating devices, such as lamps, in parallel circuit with said source of electricity, a suitable device in series with said source of electricity between the battery and translating devices for producing a drop in electro-motive force, and a magnet in a circuit uniting opposite terminals of said source of electricity for introducing and withdrawing said device with respect to said circuit, substantially as described.

GEO. B. PRESCOTT, Jr.

Witnesses:
DANIEL E. DELAVAN,
F. D. L. WALKER.